United States Patent
Williams

[15] 3,677,659
[45] July 18, 1972

[54] MULTI-STAGE PUMP AND COMPONENTS THEREFOR

[72] Inventor: John G. Williams, Warren Township, Somerset County, N.J.

[73] Assignee: Worthington Corporation, Harrison, N.J.

[22] Filed: July 31, 1970

[21] Appl. No.: 59,928

[52] U.S. Cl.................................415/111, 415/55, 415/143, 415/170, 415/219
[51] Int. Cl..........................................................F01d 11/00
[58] Field of Search............................415/74, 111, 143, 116

[56] References Cited

UNITED STATES PATENTS

| | | | |
|---|---|---|---|
| 3,090,544 | 5/1963 | Woolenweber, Jr. et al. | 415/111 |
| 3,090,546 | 5/1963 | Woolenweber, Jr. et al. | 415/111 |
| 3,398,929 | 8/1968 | Schreiber et al. | 415/111 |
| 3,048,118 | 8/1963 | Erd | 415/111 |

FOREIGN PATENTS OR APPLICATIONS 64,052   4/1953   France...................................415/143

Primary Examiner—C. J. Husar
Attorney—Popper, Bain, Bobis & Gilfillan

[57] ABSTRACT

A multi-stage pump including a casing having an inducer section and at least one impeller section. A shaft rotatably driven by a suitable prime mover extends into the casing and the inducer and the impeller or impellers as the case may be in the casing are mounted on and are rotatable with the shaft.

Novel spaced tapered roller bearing assemblies support the shaft, each bearing assembly being separately lubricated by a lubricant, e.g. grease, which is pumped by the action of the roller bearings through connected chambers and passages about the respective roller bearing assemblies. The spaced roller bearing assemblies are stressed for rigidity in assembled position by a telescoping piston means which defines a fluid chamber into which any suitable fluid can be introduced to force the piston means to engage and exert stress on the outer races of the respective tapered roller bearing assemblies for maintaining the tapered rollers thereof in contact with the races at all times during operation. Alternatively, slingers can be mounted for rotation with the shaft adjacent each of the tapered roller bearing assemblies for assisting the pumping action of the tapered roller bearings and for dissipating bearing heat.

Axial thrust along the shaft is balanced by a fluid line connecting a leakage cavity behind the back shroud of the last mounted impeller to the inlet or suction side of the impeller. A pressure regulating valve may be provided in the fluid line for varying the pressure of the fluid in the leakage cavity as a function of variations in the pressure of the fluid flowing into the inlet or suction side of the pump.

The pump provides for a reduction in cavitation at low load conditions by withdrawing or passing back flowing fluid from the periphery of the inducer through a leakage passage in communication with the pump suction. Additionally, cavitation over the entire operating range of the pump is reduced by communicating the leakage joints of the impeller casing wearing rings with the pump suction.

Also disclosed is novel casing structure for withdrawing gases from suction fluid, withdrawn back flow fluid and fluid leakage from the wearing rings.

17 Claims, 5 Drawing Figures

Patented July 18, 1972

JOHN G. WILLIAMS
INVENTOR.

BY Popper, Bain, Bobis + Gilfillan
attys

JOHN G. WILLIAMS
INVENTOR.

BY Popper, Bain, Bobis & Gilfillan
attys

3,677,659

MULTI-STAGE PUMP AND COMPONENTS THEREFOR

BACKGROUND OF THE INVENTION

This invention relates to pumps and more specifically to multi-stage pumps, components sections therefor and improvements thereto.

Among the areas of continuing concern to those engaged in the development of pumps are the adequacy of bearing lubrication, the accomplishment of axial thrust balance in the shaft, and the elimination of cavitation and other sources of flow interference in the areas of the fluid propulsion devices e.g. propellers and impellers.

Considering initially bearing lubrication, it will be recognized by those skilled in the art that both grease lubrication systems and oil lubrication systems have been utilized in pumps of this type. The oil lubrication systems have been used more extensively, however as is recognized by those skilled in the art, such systems are expensive, suffer from leakage difficulties and, with respect to known structural arrangements, present circulation problems. Grease lubrication systems, while relatively inexpensive, suffer from the disadvantage that circulation is difficult and oil laden grease located at the rollers between the races is used repeatedly until the oil therein becomes thin and fatigued. Although the answer to this problem would appear to be the provision of a system for circulating the grease through the bearing, no satisfactory system heretofore has been developed which accomplishes grease circulation as well as enabling grease replacement without requiring a major disassembly of the structure.

With respect to the problem of balancing axial thrust, it is recognized in the art that balancing axial thrust in conventional single suction centrifugal impellers ordinarily is achieved by means of holes drilled through the back shroud of the impeller into the impeller eye, which holes communicate the eye with a balancing chamber provided rearwardly of the back shroud. The holes are drilled adjacent the leading edges of the vanes at points where the head generated by the impeller is relatively low. Thus, the pressure in the balancing chamber is substantially equal to the impeller suction pressure thereby providing a pressure differential across the back shroud sufficient to achieve the desired thrust balance. Additionally, the conventional holes in the back shroud accommodate the flow therethrough of leakage from the back shroud casing wearing ring thereby recirculating the fluid into the main fluid flow.

Where, as with the pump of the disclosure, a centrifugal impeller is combined with an inducer to define a multi-stage pump, the use of impeller balancing holes is no longer a satisfactory mode of accomplishing axial thrust balance because of the fluid head generated by the inducer. More specifically, the head generated by the inducer causes a relatively high fluid pressure to be experienced in the impeller pumping chamber thereby increasing the axial load on the shaft and reducing the pressure differential across the back shroud. One approach to minimizing the effect of this difficulty has been to decrease the diameter of the pressure side wearing rings with respect to the suction side wearing rings. However, since the head-capacity curve of an inducer is ordinarily very steep, the fluid pressure in the balancing chamber will vary significantly with changes in load conditions. Thus, axial thrust balancing over a wide range of pump capacities cannot be achieved with the use of holes drilled through the back shroud of the impeller.

Finally, it should be noted that the utilization of balancing holes in impellers also generates a cross-stream flow issuing from such holes in the vicinity of the leading edges of the impeller vanes. The cross-flow contributes to the third problem noted above with respect to known pump designs, viz. fluid cavitation.

Multi-stage pumps have experienced cavitation generated by fluid flowing from holes in the impeller shroud as well as cavitation generated by flows of fluid from other sources in both the inducer sections and the impeller sections of the pumps. More specifically, in most centrifugal pumps, wearing rings are ordinarily provided between the impeller and the impeller casing which wearing rings are located between the casing and impeller back shroud, and the casing and impeller front shroud adjacent the impeller inlet opening. As noted above, leakage fluid through the back shroud wearing rings in known pump configurations has been returned to the main fluid flow through suitable holes provided in the impeller back shroud. Leakage fluid through the front shroud wearing rings has also been discharged into the main fluid flow adjacent the impeller inlet opening. Such discharge from both the front shroud wearing ring leakage joint and the impeller holes has created cavitation in the fluid being pumped, thereby decreasing the efficiency of the pump. Thus, in addition to the fact that impeller holes are undesirable in multi-stage pumps because of the axial thrust balancing problem, the wearing ring fluid leakage through these holes as well as through the leakage joints of the front shroud wearing rings is also undesirable because of the cavitation generated thereby.

An additional source of fluid turbulence in known pump structures is the back flow which is ordinarily experienced adjacent the inner surface of the inducer pumping chamber resulting from the action of the propellers. The occurrence of such backflowing fluid interferes with the flow of fluid within the pumping chambers and thus decreases the useful range of operation of the pump at low net positive suction heads.

It is the principal object of the present invention, therefore, to provide a pump, and in particular a multi-stage pump having both an inducer section and an impeller section wherein cavitation and related fluid flow interferences are reduced to a minimum wherein axial thrust balance is achieved over a wide range of operating conditions, and wherein the pump shaft is supported for rotation within a bearing which is lubricated by a circulating lubricant.

SUMMARY OF THE INVENTION

The foregoing principal object and others not enumerated are achieved by a pump structure in accordance with the present invention, one embodiment of which may comprise a multi-stage pump including a casing having an inducer section and at least one impeller section. Such a pump may include a shaft rotatably driven by a suitable prime mover which shaft extends into the casing for rotatably driving an inducer as well as an impeller or impellers as the case may be. The shaft may be supported for rotation by nozzle spaced tapered roller bearing assemblies wherein the tapered rollers of the bearings are utilized to pump lubricant through the bearings and around a closed lubricant system. Additionally, the pumping action of the tapered rollers may be augmented by the provision of slingers mounted for rotation on the shaft and extending into the lubricant system. The spaced roller bearing assemblies may also be stressed for rigidity in their assembled position by a telescoping piston which cooperates with the outer bearing cover to define a fluid chamber into which any suitable fluid can be introduced to force the piston means to engage and exert stress on the outer races of the respective tapered roller bearing assemblies for maintaining the tapered rollers thereof in contact with their races at all times during operation.

An embodiment of pump according to the invention may also include means for balancing axial thrusts along the shaft comprising a fluid line for connecting a leakage cavity behind the back shroud of the last mounted impeller to the inlet or suction side of the pump. A pressure regulating valve may be provided in the fluid line for varying the pressure of the fluid in the leakage cavity as a function of variations in the pressure of the fluid flowing into the inlet or suction side of the pump.

An embodiment of pump according to the invention may also include means for reducing the occurrence of cavitation including a leakage passage in communication with the pump suction for allowing the passage of backflowing fluid from the periphery of the inducer out of the inducer pumping chamber and into the pump suction for recirculation within the pump. Additionally, a pump according to the invention may reduce cavitation over its entire operating range by providing a passage for communicating the leakage joints of the impeller casing wearing rings with the pump suction.

Finally, a pump structured in accordance with the teachings of the invention may incorporate a novel casing structure for accommodating the withdrawal of gases from the fluid being pumped.

BRIEF DESCRIPTION OF THE DRAWINGS

A more complete understanding of the present invention may be had from the following detailed description, particularly when read in the light of the accompanying drawings wherein.

DETAILED DESCRIPTION

Figures 1, 2:
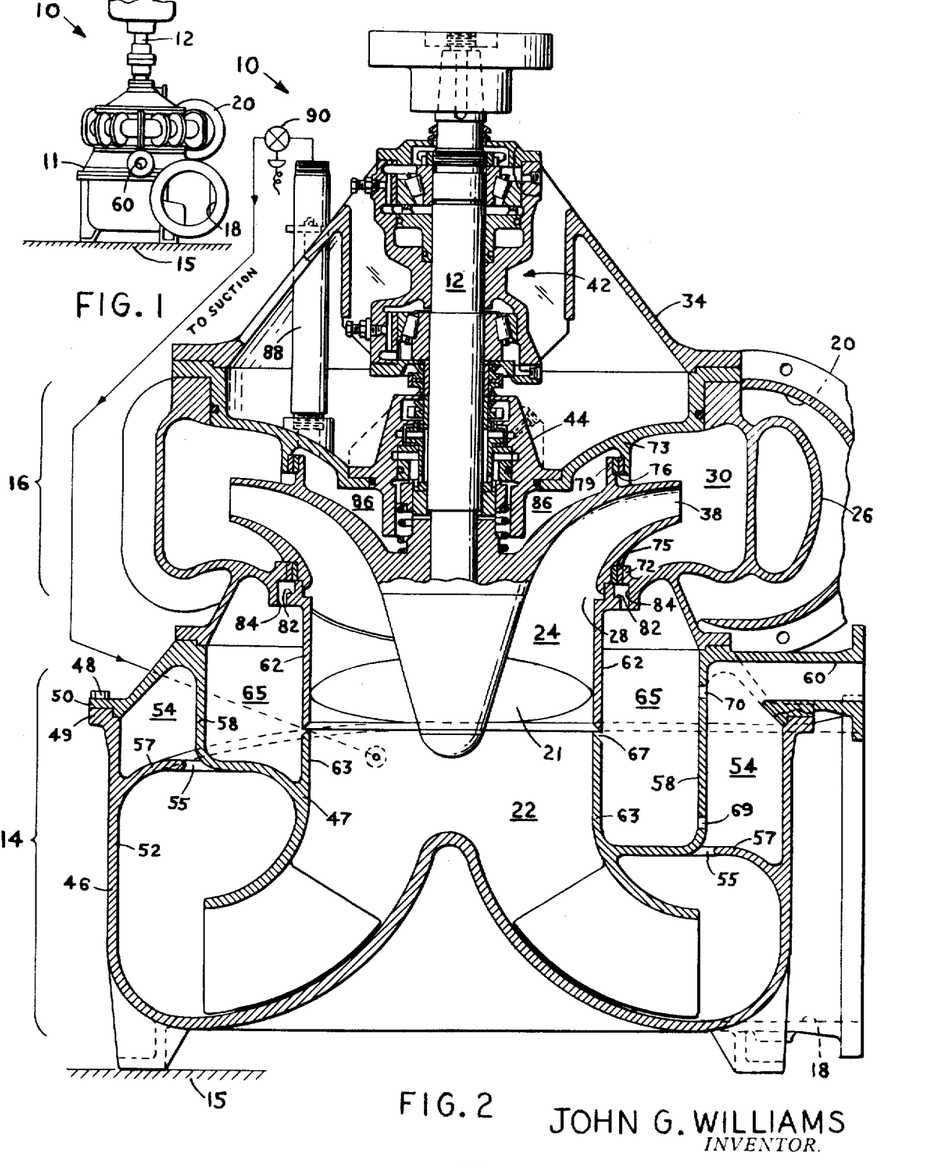
FIG. 1 is a side elevational view of a pump structure in accordance with the present invention.
FIG. 2 is a cross-sectional, elevational view of the pump of FIG. 1.

Referring therefore to FIGS. 1 and 2, a multi-stage pump according to the present invention is shown and designated generally by the reference numeral 10.

Pump 10 is a vertical pump including a casing 11 into which a shaft 12 extends, which shaft is driven by a prime mover (not shown) e.g. an electric motor, steam turbine or the like. Casing 11 includes an inlet or suction opening 18, a discharge opening 20 and a vent opening 60, all as are shown in FIG. 1.

Referring in particular to FIG. 2, casing 11 can be seen to include an inducer section designated generally by the reference numeral 14, which is supported by structural legs to a base 15, an impeller section designated generally as 16 which is secured to and disposed above inducer section 14, and a bearing support frame 34 secured above impeller section 16.

An inducer 21 is mounted for rotation on shaft 12 in inducer section 14, which inducer 20 draws fluid through an inducer suction chamber 22 and an inducer pumping chamber 24. The discharge from inducer pumping chamber 24 passes into a double-volute impeller casing 26 of impeller section 16 through an impeller inlet opening 28. Impeller inlet opening 28 and pump discharge opening 20 are in communication through an impeller pumping chamber 30 wherein is mounted on shaft 12 for rotation therewith an impeller 38.

Shaft 12 is journaled for rotation within a bearing 42 which bearing is discussed below in detail, and extends into double-volute casing 26 through a conventional stuffing box 44.

Considering the structure of pump 10 in more detail, and with specific reference to FIG. 2, the inducer section 14 of casing 11 can be seen to comprise an outer casing section 46 and an inner casing section 47 which are rigidly secured by bolts 48 extending through aligned bores in mating flanges 49 and 50, which flanges are formed on casing sections 46 and 47 respectively.

Casing sections 46 and 47 cooperate to define an inlet scroll 52 for directing fluid to be pumped into suction chamber 22, and a gas collection space 54 which is in communication with inlet scroll 52 through an annular slot 55 defined by the cooperation of a radially inwardly extending flange 57 on outer casing section 46 and the outer edge of a partition wall 58 of inner casing section 47. Gas collected in collection space 54 is exhausted to a gas removal system (not shown) through exhaust port 60 formed in the upper portion of inner casing section 47.

Double-volute casing 26 is provided with a cylindrical lower section 62 which depends from casing 26 to extend within inner casing section 47. Lower section 62 cooperates with an inner wall 63 of inner casing section 47 to define inducer pumping chamber 24 in which inducer 21 is operably positioned. Additionally, lower section 62 cooperates with inner casing section 47 and the under-surface of double-volute casing 26 to define a suction chamber 65. The upper edge of inner wall 63 and the lower edge of lower section 62 are spaced apart when pump 10 is assembled so as to define a downwardly, outwardly inclined slot 67 which communicates inducer pumping chamber 24 with suction chamber 65. Passage of fluids from suction chamber 65 into gas collection space 54 is accomplished through a drain bore 69 formed in partition wall 58 adjacent the low point of suction chamber 65. Gases which may be collected in suction chamber 65 are passed therefrom into gas removal chamber 54 through vent bores 70 formed in partition wall 58 adjacent exhaust port 60.

The lower and upper inner surfaces of double-volute casing 26 are provided with annular flanges 72 and 73, respectively, which define mounting flanges for the stationary elements of a first casing wearing ring 75 and a second casing wearing ring 76. As is evident from the drawing, wearing rings 75 and 76 are double-ring construction, the rotating element of ring 75 being secured to a suitable mounting surface on the front shroud 78 of impeller 38, and the rotating element of ring 76 being mounted on an annular flange 79 formed on the back shroud 80 of impeller 38.

The leakage joint of wearing ring 75 communicates the high pressure area of impeller pumping chamber 30 with an annular channel 82 formed by the cooperation of front shroud 78 with double-volute casing 26 adjacent lower section 62. Annular channel 82 in turn, is in communication with suction chamber 65 through a plurality of bores 84 formed in casing 26. Thus, as is discussed in detail below, fluid passing through the leakage joint of wearing ring 75 passes into channel 82 and thereafter through bores 84 into suction chamber 65 rather than between front shroud 78 and casing 26 into impeller inlet opening 28 as is ordinarily the case in prior art structures.

The structure of second wearing ring 76, back shroud 80, the upper inner surface of casing 26, and the structure of stuffing box 44 cooperate to define a leakage cavity 86 behind back shroud 80 adjacent shaft 36. Leakage cavity 86 is in communication with the suction of inducer section 14 through a leakage line 88. In this regard, there may be provided in leakage line 88 a flow control valve 90 which is adapted to control the flow of fluid through leakage line 88 in response to fluid pressure experienced at the impeller inlet opening 28 as is discussed below in detail. Thus, fluid passing into leakage cavity 86 through the leakage joint of second casing wearing ring 76 is withdrawn therefrom to the suction of inducer section 11 through leakage line 88.

Considering now the operation of the liquid end of pump 10, it will be assumed for purposes of this discussion that the pump is primed and shaft 12 is being rotated by the prime mover means to rotate inducer 21 and impeller 38 to cause a flow of fluid within the pump. More specifically, fluid to be pumped is drawn into pump 10 through inlet opening 18 in casing 11. Fluid from inlet opening 18 is passed through inlet scroll 52 and thereafter upwardly into suction chamber 22 and inducer pumping chamber 24 wherein it is propelled upwardly by the action of rotating inducer 21. Entrained gases in the fluid being pumped will, for the most part, be separated therefrom and passed upwardly out of inlet scroll 52 and through annular slot 55 into gas collection space 54 whereafter they will be removed from pump 10 through exhaust port 60.

As is recognized by those skilled in this art, the operation of inducer 21, particularly under less than full load conditions, causes a back flow within inducer pumping chamber 24 which, in the absence of some backflow control, interferes with the flow of fluid through the inducer pumping chamber. The present invention accommodates for this backflow by providing slot 67 between cylindrical lower section 62 of impeller casing 26 and the inner wall 63 of inner casing section 47. Thus, backflowing fluid from inducer 21 passes downwardly adjacent the inner surface of lower section 62 and thereafter outwardly through slot 67 into suction chamber 65. This passage of fluid from inducer pumping chamber 24 into suction chamber 65 is assisted by the fact that suction chamber 65 is in fluid communication with inlet scroll 52 and is subject therefore to suction pressure which is less than the fluid pressure ordinarily experienced adjacent slot 67. Once fluid is discharged through slot 67 into suction chamber 65, any entrained gases are separated therefrom and passed into gas collection space 54 through bore 70 in partition 58 whereafter they are removed from pump 10 through exhaust port 60. The fluid in suction chamber 65 is discharged therefrom through bore 69 in the lower end of partition 58 whereafter it is caused to pass through slot 55 into inlet scroll 52 for recirculation through the pump.

After having passed through inducer section 14, the fluid being pumped passes through impeller inlet opening 28 and into impeller 38 whereby it is pumped radially outwardly and toward the surface of double-volute casing 26 from which it is discharged through discharge opening 20.

The fluid in impeller pumping chamber 30 on the discharge side of impeller 38 is a relatively high pressure fluid. As is recognized by those skilled in this art, such high pressure fluid is used to pass through the leakage joints of wearing rings to lubricate the rings and facilitate rotation of the impeller within the casing. Such is the case with the pump of the present invention. However, whereas the leakage fluid passing through the leakage joints in wearing rings in most prior art pumps is reinjected into the fluid flow of the pump in the area of the impeller thus giving rise to cavitation and other flow disturbances as is discussed above, such is not the case with the structure of the present invention. More specifically, leakage fluid from impeller pumping chamber 30 passes through the leakage joint of first casing wearing ring 75 an into annular channel 82 formed by the cooperation of casing 26 and the front shroud 78 of the impeller 38. Thereafter, however, the leakage fluid passes through a plurality of bores 84 into suction chamber 65 whereafter it is caused to pass through bore 69 and slot 55 to be recirculated once again through pump 10. The flow of leakage fluid in this manner is insured because, as is noted above, suction chamber 65 is in communication with the suction end of pump 10 through gas collection space 54. Thus, a pressure substantially equal to suction pressure is experienced in suction chamber 65 whereas the pressure in fluid pumping chamber 30 both on the discharge side of impeller 38 and at the impeller inlet opening 28 is substantially greater than suction pressure. Thus, the flow of fluid from impeller pumping chamber 30 into suction chamber 65 is insured, cross flows of fluid in the impeller flow stream resulting from wearing ring leakage are obviated, and cavitation as a result of the injection of fluid at this point is eliminated.

The flow of fluid from the impeller pumping chamber 30 adjacent the discharge of impeller 38 through second casing wearing ring 76 into leakage cavity 86 is insured because leakage cavity 86 is in fluid communication with the suction side of pump 10 through fluid line 88. Although operation of flow control valve 90 may result in the pressure in leakage chamber 86 being greater than suction pressure depending upon the pressure of fluid at the inlet opening of impeller 38, the pressure in chamber 86 is always less than that experienced at the discharge of impeller 38 and thus flow through wearing ring 76 is always from impeller pumping chamber 30 through wearing rings 76 into leakage cavity 86.

The diameter of the leakage joint of first casing wearing ring 75 is substantially equal to the diameter of the leakage joint of second casing wearing ring 76. Thus, the area of back shroud 80 which is exposed to leakage cavity 86 and therefore subject to pump suction pressure, or such other pressure as may be determined by flow control valve 90, is substantially equal to the area of impeller 38, including the area of impeller inlet opening 28 as well as that portion of annular channel 82 which is below the rotating element of first casing wearing ring 75, which is subject to suction pressures. Thus, with suction pressure applied to this area, the inducer-impeller combination can be considered as a single unit which is in complete hydraulic balance under all operating conditions.

As a practical matter, however, it should be noted that the above-described structure achieves complete axial thrust balance with the exception of residual axial thrusts due to the suction pressure acting on the shaft sleeve area. Although these residual thrusts are ordinarily small and can be supported by inexpensive bearings of modest thrust capacity, there are situations where the suction pressure is substantially higher than atmospheric pressure and the net force acting on the shaft sleeve area may produce very large thrusts. In such situations, the relatively high suction pressure is sensed in the area of impeller inlet opening 28 and flow control valve 90 is modulated to regulate the pressure in leakage chamber 86 by a sufficient amount to balance the residual axial thrust resulting from the high suction pressure. The particular setting for flow control valve 90 in response to any particular suction pressure for establishing a pressure in leakage cavity 86 can be determined by one having ordinary skill either empirically or by calculation.

Thus, it can be seen with respect to the liquid end of pump 10 that there is provided a novel combination of elements which cooperate to provide axial thrust balancing without causing an introduction of fluid injection in the impeller flow stream with the attendant cavitation and flow interruption, which maintain axial thrust balancing notwithstanding the occurrence of relatively high suction pressures, and which provide for the removal of backflowing fluid from upstream of the inducer so as to avoid further disturbances and interruptions in the flow of fluid through the inducer section of the pump into the impeller section of the pump. Additionally, with all of the foregoing, the novel pump structure provides for the removal of gases from fluids not only at the area of the inlet scroll, but also with respect to fluid discharged as backflow fluid and fluid discharged from the leakage joint of the casing wearing rings. These improvements enable the more efficient and economic operation of pump 10 and constitute a significant step forward in this art.

Having considered in detail the liquid end of pump 10 and in particular the novel structure thereof relating to the present invention, the structure of one embodiment of bearing 42 according to the invention is now described in detail.

Figures 3, 4, 5:
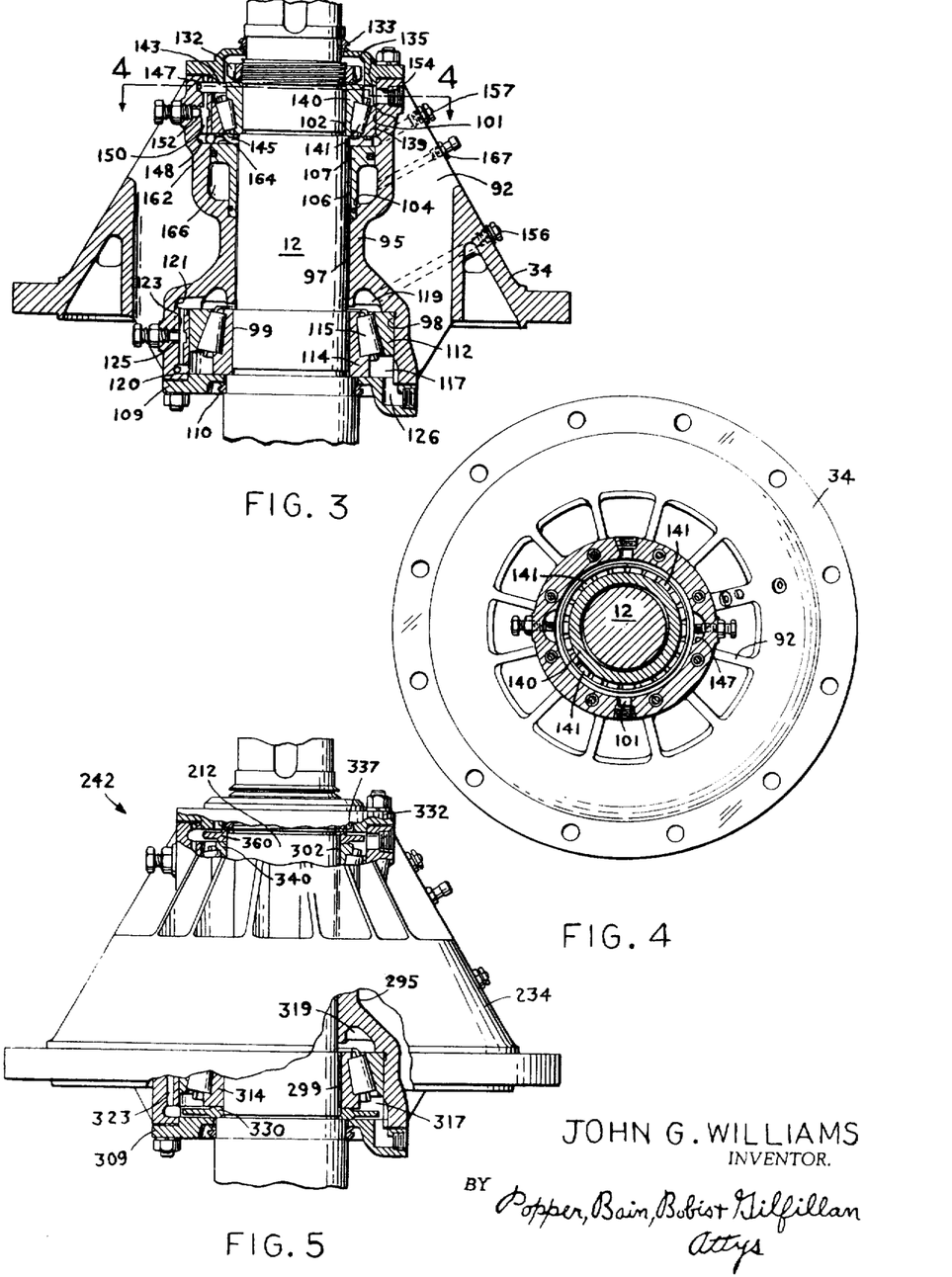
FIG. 3 is a cross-sectional view of a shaft bearing structured in accordance with the present invention.
FIG. 4 is a cross-sectional view through the plane 4—4 of FIG. 3.
FIG. 5 is a cross-sectional view of an alternative embodiment of shaft bearing structured according to the principles of the present invention.

More specifically, and referring to FIGS. 3 and 4, bearing 42 includes a generally conical bearing support frame 34 having a plurality of radially extending webs 92 which support a centrally disposed outer bearing cover 95. Outer bearing cover 95 is a generally cylindrical member having a main bore 97 extending longitudinally axially therethrough for rotatably receiving main shaft 12. Formed in the lower end (as seen in FIG. 2) of outer bearing cover 95 is a first longitudinally axially extending counter bore 98 in which is received a first tapered roller bearing assembly 99. The upper end of outer bearing cover 95 is provided with a second longitudinal counter bore 101 in which is received a second tapered roller bearing assembly 102. The junction of second counter bore 101 with main bore 97 is relieved to define an annular channel 104 which is adapted to receive slidably the sleeve section 106 of a cylindrical piston 107, which piston is slidably received on shaft 12 as is discussed below in detail.

Considering the lower portion of bearing 42, i.e. the structure specifically related to the operation of first tapered roller bearing 99, the end opening in outer bearing cover 95 as defined by first counter bore 98 is closed by a first end cover 109 which may be secured to outer cover 95 by suitable means such as bolts. Leakage of lubricant between shaft 12 and end cover 109 is prevented by a seal 110 which may be of any of the known types.

End cover 109, first counter-bore 98 and shaft 12 cooperate to define a lubricant containing cavity in which first tapered roller bearing assembly 99 is received. In this regard, tapered roller bearing assembly 99 comprises an outer race 112 securely received within first counter-bore 98, an inner race 114 which is securely received on shaft 36 for rotation therewith, and a plurality of tapered rollers 115 therebetween.

The lower or upstream end of first tapered roller bearing assembly 99, end cover 109 and the surface of counter-bore 98 cooperate to define an upstream lubricant chamber 117. Similarly, the upper or downstream end of first tapered roller bearing assembly 99 cooperates with first counter-bore 98 to define a downstream lubricant chamber 119. The peripheral surface of first counter-bore 98 is relieved adjacent lubricant chambers 117 and 119 to define annular channels 120 and 121, respectively. Additionally, annular channels 120 and 121 are in fluid communication through a longitudinally extending bore 123 formed in outer bearing cover 95.

Fluid access to first tapered roller bearing 99 is provided through a plugged radial passage 125 in outer cover 95 which communicates with bore 123, and also through a plugged passage 126 in end cover 109 which communicates with upstream lubricant chamber 117.

The lower end of inner bearing race 114 is juxtaposed a shoulder formed on shaft 12, which shoulder serves to position inner race 114 in proper axial position on the shaft. In this regard, it can be seen that a plurality of shoulders are provided on shaft 12 as it passes through bearing 42. As will be recognized by those skilled in this art, such shoulders are provided to facilitate axial positioning of the shaft-mounted bearing components during assembly.

The upper end of bearing 42 is similar in most respects to the lower end except for the provision of a piston 107 which is slidably mounted within second counter-bore 101. More specifically, the end opening of second counter-bore 101 is closed by an end cover 132 which is secured to outer cover 95 by suitable means such as bolts. Leakage between end cover 132 and shaft 36 is prevented by an annular seal 133. Further, end cover 132 is provided with a counter-bore 135 for receiving therein a nut 137 which threadedly engages shaft 12 to maintain the shaft mounted components of bearing 42 in snug engagement with their respective positioning shoulders as is discussed above.

End cover 132, second counter-bore 101, piston 107 and shaft 12 cooperate to define a lubricant containing cavity in which second tapered roller bearing assembly 102 is received. Second tapered roller bearing assembly 102 comprises an outer race 139 securely received within second counter-bore 101, and inner race 140 which is securely received on shaft 12 for rotation therewith, and a plurality of tapered rollers 141 therebetween.

The upper or upstream end of second tapered roller bearing assembly 102, end cover 132, and the surface of second counter-bore 101 cooperate to define an upstream lubricant chamber 143. Similarly, the lower or downstream end of second tapered roller bearing assembly 102 cooperates with second counter-bore 101 and piston 107 to define a downstream lubricant chamber 145. The peripheral surface of second counter-bore 101 is relieved adjacent lubricant chambers 143 and 145 to define annular channels 147 and 148, respectively. Additionally, annular channels 147 and 148 are in fluid communication through a longitudinally extending bore 150 formed in outer bearing cover 95.

Fluid access to second tapered roller bearing assembly 102 is provided through a plugged radial passage 152 in outer cover 95 which communicates with bore 150, and also through a plug passage 154 in outer cover 95, which passage communicates with upstream lubricant chamber 143. It should also be noted that downstream lubricant chambers 119 and 145 are provided with grease nipples 156 and 157, respectively, for the purpose of charging the lubricant chambers with grease in preparation for operation of bearing 42.

As discussed briefly above, a piston 107 is slidably disposed within second counter-bore 101 in such a manner that sleeve 106 thereof is slidably received within annular channel 104. Piston 107 is a generally cylindrical member, the inside diameter of which is such as to enable the free rotation of shaft 12 therein and the sliding of piston 107 along the surface of shaft 12. The upper radial surface (as seen in FIG. 3) of piston 107 is provided with an axially extending annular shoulder 162 which shoulder engages the lower surface of outer bearing race 139. Shoulder 162 is provided with a plurality of apertures 164 for the purpose of allowing free passage of lubricant from the outer portion of downstream lubricant chamber to the inner portion of downstream lubricant chamber adjacent rollers 141.

The lower end of second counter-bore 101 is relieved and cooperates with sleeve 106 of piston 107 to define a fluid space 166. In this regard, the fluid contemplated for use in bearing 42 is air. Thus, there is provided a valved air supply line 167 for accommodating the introduction of pressurized air into fluid space 166 for the purpose discussed below in detail. Escape of fluid from space 166 either between second counter-bore 101 and the outer surface of piston 107 or between the outer surface of sleeve 106 and the surface of annular channel 104 is prevented by suitable O-rings mounted in annular channels formed in the outer surface of sleeve 106 and piston 107.

The novel bearing structure described above is a substantial step forward in the art because, by reason of its structure, it provides for the circulation of lubricant in a filled and closed lubricant chamber, i.e. from the respective downstream lubricant chambers through the roller bearings into the respective upstream lubricant chambers and thereafter through communicating passages back to the respective downstream lubricant chambers. The manner in which this flow of lubricant in a filled, closed lubricant system is accomplished is best understood from the following discussion of the operation of bearing 42.

The operation of upper and lower bearing assemblies is the same in terms of lubricant circulation, accordingly the following description is limited to the operation of the lower bearing assembly. Thus, with the bearing assembly in position on shaft 36 and bearing support frame 34 secured to double-volute casing 26 as best seen in FIG. 2, the bearing is charged with lubricant through grease nipple 156. In this regard, the present invention enables the utilization of grease lubricant because of the circulation of lubricant as is discussed below. With the lubricant filling the entire lubricant cavity, including both upstream lubricant chamber 117, downstream lubricant chamber 119 and the associated passages, shaft 12 can be rotated during the operation of the pump by the prime mover (not shown). Rotation of shaft 12 causes rotation of inner race 114 therewith and a corresponding rolling rotation of tapered roller bearings 115 between outer race 112 and inner race 114. As is evident from the drawings, tapered roller bearings 115 are canted outwardly from the longitudinal axis of shaft 12 in such a manner that the small diameter end of roller bearings 115 is closer to the axis of shaft 12 and the larger diameter end is away from the axis of shaft 12. In view of the fact that the lubricant containing chamber is a closed and filled fluid chamber, and in view of the fact that any rotating conical body such as tapered roller bearings 115, when surrounded by a confined fluid flow path, acts as a centrifugal impeller when rotating, the rotation of tapered roller bearings 115 during their revolution around the axis of shaft 12 causes the lubricant in the bearing assembly to be pumped from downstream lubricant chamber 119 around the bearing surfaces and into upstream lubricant chamber 117 whereafter the lubricant passes through annular channel 120 and bore 123 into the annular channel 121 of downstream lubricant chamber 119 for recirculation through the bearings. Thus, each of tapered roller bearings 115 defines a pump impeller which generates a head causing the passage of lubricant through the bearings to accomplish continuing lubrication without grease fatigue as is ordinarily experienced in prior art grease lubricated bearings. It should be recognized, however, that any lubricant capable of being pumped through the particular roller bearing can be utilized according to the teaching of this invention.

The structure of bearing shown in FIG. 3 is provided with suitable fittings to accomplish grease removal and replacement. More specifically, those skilled in this art will recognize that it is advantageous to periodically change the lubricant in a bearing and to be able to accomplish such a change without total disassembly of the bearing. With respect to bearing 42, and with particular reference to the first tapered roller bearing assembly 99, grease removal and replacement is accomplished by initially removing the plugs from radial passage 125 and passage 126. Thereafter, a high pressure air supply (e.g. 100 psi) is inserted into grease nipple 156 and the shaft 12 is slowly rotated by hand until all grease has been ejected through passages 125 and 126. The plugs are then reinserted in passages 125 and 126 and the lubricant chamber is filled with a solvent through grease nipple 156 to dissolve any residual grease not removed by the air blasting procedure. Thereafter, the plugs are then removed from passages 125 and 126 and the solvent is drained away. The process of filling the lubricant chamber with solvent and thereafter draining is repeated until the solvent effluent is clear. Additionally, it should be noted that a long plug can be inserted through radial passage 125 to close off longitudinally extending passage 123 during both the air blast phase of bearing cleaning and the solvent phase of bearing cleaning in order to insure that both the air blast and solvent material pass through the bearings and are not bypassed through passage 123. Thus, not only is passage 123 cleaned but also all of the surfaces around the bearings 115 are cleaned. With the bearing elements so cleaned, as well as with the plugs from openings 125 and 126 removed, a new charge of grease lubricant is injected through grease nipple 156 until grease can be seen to appear through passages 125 and 126 thus indicating that the lubricant chamber is filled with lubricant and there is no entrapped air.

The structure of bearing assembly described above, therefore provides for the circulation of lubricant through the rollers at all times thus enabling a constant flow of lubricant through the rollers with the attendant advantages. In addition, however, it can be seen from FIG. 3 that second tapered roller bearing assembly 102 is in contact with the annular ring 162 of piston 107. The purpose of this structural arrangement is to provide a preload against the outer races 112 and 139 of first and second tapered roller bearing assemblies 99 and 102 in order to insure that the roller bearings are at all times in surface to surface contact with both the inner and outer races during operation of the bearing.

Referring to FIG. 3, it can be seen that the upper surface of outer race 112 of first tapered roller bearing assembly 99 is in engagement with a shoulder formed adjacent the bottom of first counter-bore 98 of outer bearing cover 95. Thus, downwardly directed forces acting on outer bearing cover 95 will be transmitted to outer race 112. Distinguishably, the outer race 139 of second tapered roller bearing assembly 102 is slidably received within second counter-bore 101 of outer bearing cover 95 thus precluding the possibility that any such axially directed forces acting on outer bearing cover 95 are transmitted to outer race 139. Rather, the lower surface of outer race 139 is in contact with annular shoulder 162 of piston 107. Thus, any axial forces exerted upon piston 107 tending to displace piston 107 upwardly are transmitted through shoulder 162 to outer race 139 of second tapered roller bearing assembly 102.

As noted above, piston 107 and outer bearing cover 95 cooperate to define a fluid space 166 which may be charged with compressed air through valved air supply line 167. Thus, when compressed air is introduced to fluid space 166 through valved air supply line 167, the pressure of the air acting on piston 107 and outer bearing cover 95 tends to displace piston 107 upwardly and outer bearing cover 95 downwardly. Thus, axial forces are exerted against both outer race 112 of first tapered roller bearing assembly 99 and outer race 139 of second tapered roller bearing assembly 102, which axial forces tend to urge the bearing surfaces of the races into contact with rollers 115 and 141 thereby establishing and maintaining surface-to-surface contact between rollers 115 and 141 and their respective inner and outer races at all times, both during operation of the bearing and at other times so long as pressure is maintained in fluid space 166. This capability to maintain rollers 115 and 141 in contact with their respective bearing races even when shaft 12 is not rotating is a distinct advantage of the present structure because it enables the avoidance of impact between the roller surfaces and the bearing race surfaces as a result of environmental vibrations when the equipment is not otherwise in operation.

A second embodiment of structure in accordance with the principles of the present invention is shown in FIG. 5 and designated generally by the referenced number 242. The structure of bearing 242 is in all respects the same as the structure of bearing 42 with the exception that slinger means are provided in the upstream lubricant chambers of each of the first and second tapered roller bearing assemblies.

More specifically, bearing 242 includes an outer bearing cover 295 which is rigidly secured to a bearing support frame 234. Bearing cover 295 is provided with suitable counterbores to accommodate the reception of a first tapered roller bearing assembly 299 and a second tapered roller bearing assembly 302. The end of outer bearing cover 295 adjacent first tapered roller bearing assembly 299 is closed by an end cover 309 which is secured to outer bearing cover 295 by a suitable means such as bolts. Similarly, the end of outer bearing cover 295 adjacent second tapered roller bearing assembly 302 is closed by an end cover 332 which is provided with a counter-bore to accommodate the reception of a nut 337 for axially securing the shaft mounted bearing components in operating position. As discussed above in detail with respect to bearing 42, first tapered roller bearing assembly 299 cooperates with its counter-bore in counter bearing cover 95 to define an upstream lubricating chamber 317 and a downstream lubricating chamber 319 which chambers are in fluid communication through a longitudinally extending passage 323 formed in outer bearing cover 295. Disposed between inner race 314 of first tapered roller bearing assembly 299 and end cover 309 is a slinger 330 which is rigidly secured to shaft 212 for rotation therewith. Slinger 330 extends radially into upstream lubricant chamber 317 and bears on its one radial surface against inner race 314 and on its opposed radial surface against a shoulder formed on shaft 212 for positioning slinger 330 axially.

In a similar manner, there is disposed on shaft 212 for rotation therewith and adjacent to inner race 340 of second tapered roller bearing assembly 302 a slinger 360 which is in surface-to-surface contact on one radial surface with inner race 340 and on its other radial surface with bearing component securing nut 337. Slinger 360 extends radially into upstream lubricant chamber 143 for rotation therein with the rotation of shaft 212.

Slingers 330 and 360 serve a two-fold purpose. Initially, each serves to augment the pumping action of rollers 315 and 341 in assisting the circulation of lubricant through the tapered roller bearing assemblies. Additionally, the slingers serve to transfer frictional heat generated at the inner races toward the area of the outside bearing cover 295 where it is dissipated to the surrounding air. Although this heat rate is small, it is advantageous to remove it continuously so as to prevent a significant temperature differential between the inner and outer races. Additionally, a close clearance between the slingers and the adjacent end covers also tends to prevent leakage of grease from the lubricant chambers.

In view of the foregoing detailed description, it is considered to be evident that the disclosed structure of pump 10 defines a new and improved pump which incorporates novel structural features which reduce cavitation, improve axial thrust balancing characteristics, improve bearing support structure and generally cooperate to define a novel pump structure. In this regard, it is considered to be manifest that many modifications to the pump as disclosed can be made without departing from the spirit of the invention.

What is claimed is:

1. A pump including:
   a casing, said casing defining an inlet opening, a discharge opening, and a pumping chamber disposed therebetween;
   fluid propulsion means disposed at least partially within said pumping chamber, said fluid propulsion means for establishing a flow of fluid through said inlet opening, said pumping chamber and said discharge opening;
   prime mover means for imparting operating rotational movement to said fluid propulsion means;
   shaft means for operably connecting said prime mover means and said fluid propulsion means;
   bearing means for supporting said shaft for rotation, said bearing means comprising, at least one tapered roller bearing assembly having an upstream end and a downstream end, said assembly including an inner race, an outer race, a plurality of tapered roller bearings operably disposed between said inner race and said outer race, and first passage means disposed outwardly of said roller bearings for communicating the upstream end of said roller bearing assembly and the downstream end of said roller bearing assembly, said first passage means for accommodating a flow of lubricant between said upstream and downstream ends of said roller bearing assembly; and
   at least a second tapered roller bearing assembly disposed in spaced relation to the first mentioned roller bearing assembly, said second tapered roller bearing assembly having an upstream end and a downstream end, and including an inner race, an outer race, a plurality of tapered roller bearings operably disposed between said inner race and said outer race for the second tapered roller bearing assembly, and second passage means disposed outwardly of said roller bearings for communicating the upstream end of said second roller bearing assembly and the downstream end of said second roller bearing assembly, said second passage means for accommodating a flow of lubricant between said upstream and downstream ends of said second roller bearing assembly.

2. A pump according to claim 1 and further including:
   an outer bearing cover, and wherein said bearing cover cooperates with said one and said second tapered roller bearing assemblies to define with respect to each said tapered roller bearing assembly an upstream lubricant chamber and a downstream lubricant chamber, and wherein said first and second passage means communicate said upstream lubricant chambers with said downstream lubricant chambers of said one and said second tapered roller bearing assemblies, respectively.

3. A pump according to claim 2 and further including:
   slinger means secured to said shaft means for rotation therewith, said slinger means extending from said shaft radially into said upstream lubricant chamber.

4. A pump according to claim 2 and further including:
   a plurality of slinger means secured to said shaft means for rotation therewith, said plurality of slinger means comprising at least one slinger means extending from said shaft radially into each said upstream lubricant chamber.

5. A pump according to claim 1 and further including:
   means on the inner race of each said one and said second tapered roller bearing assembly for restraining axial movement of said tapered roller bearings; and
   means for exerting a pressure against each said outer race whereby to maintain said inner race, said outer race and said tapered roller bearings of each said one and said second tapered roller bearing assembly in rolling contact at all times during operation of said bearing means.

6. A pump according to claim 5 wherein said means for exerting a pressure comprises:
   an outer bearing cover, said outer bearing cover for engaging the peripheral surface and at least one radial surface of said outer race of said one tapered roller bearing assembly, and said outer bearing cover for engaging the peripheral surface of said outer race of said second tapered roller bearing assembly to permit axial movement of said outer race of said second tapered roller bearing assembly therebetween;
   a piston means slidably received within said outer bearing cover, said piston means in engagement with a radial surface of said outer race of said second tapered roller bearing assembly, and said piston means cooperating with said outer bearing cover to define a fluid chamber; and
   means for introducing pressurized fluid to said fluid chamber, said pressurized fluid for urging said piston means slidably out of said outer bearing cover whereby to establish a force against said outer races for urging said outer races against said tapered roller bearings of each said one and said second tapered roller bearing assemblies.

7. A pump according to claim 6 wherein said outer bearing cover cooperates with said one and said second tapered roller bearing assemblies to define with respect to each said tapered roller bearing assembly an upstream lubricant chamber and a downstream lubricant chamber, and wherein said first and second passage means communicates said upstream lubricant chambers with said downstream lubricant chambers of said one and said second tapered roller bearing assemblies, respectively.

8. A pump according to claim 7 and further including:
   a plurality of slinger means secured to said shaft means for rotation therewith, said plurality of slinger means comprising at least one slinger means extending from said shaft radially into each said upstream lubricant chambers.

9. A multi-stage pump including:
   a casing comprising, an inducer section for defining a suction chamber and an induction pumping chamber, said inducer section having an inlet opening for allowing flow of fluid into said suction chamber and a discharge opening for allowing flow of fluid out of said induction pumping chamber;
   an impeller section for defining an impeller inlet opening, an impeller pumping chamber having a volute, and a pump discharge opening, said impeller inlet opening being in communication with said pump discharge opening through said impeller pumping chamber;
   inducer means disposed within said induction pumping chamber, said inducer means for establishing a flow of fluid through said inlet opening, said suction chamber, said induction pumping chamber and said discharge opening;
   impeller means disposed within said impeller pumping chamber, said impeller means for establishing a flow of fluid through said impeller inlet opening, said impeller pumping chamber and said pump discharge opening;
   prime mover means for imparting operating rotational movement to said inducer means and said impeller means;
   shaft means for operably connecting said prime mover means to said inducer means and said impeller means; and
   a first casing wearing ring disposed between said casing and said impeller means adjacent said impeller inlet opening, said first wearing ring defining a leakage joint one side of which is in communication with said pumping chamber adjacent said discharge opening, the other side of said leakage joint being in fluid communication with said suction chamber.

10. A multi-stage pump according to claim 9 and further including:
    passage means formed in said casing, said passage means for communicating said other side of said leakage joint with said suction chamber.

11. A multi-stage pump according to claim 9 and further including:

a second casing wearing ring disposed between said casing and a back shroud of said impeller means, said second wearing ring defining a leakage joint one side of which is in communication with said pumping chamber adjacent said discharge opening and the other side of said leakage joint being in fluid communication with said suction chamber.

12. A multi-stage pump according to claim 11 and further including:
a leakage cavity formed in said casing; and
a fluid line for communicating said leakage cavity with said suction chamber, said leakage cavity and said fluid line cooperating to define a fluid passage for communicating said other side of said leakage joint of said second casing wearing ring with said suction chamber.

13. A multi-stage pump according to claim 12 and further including:
valve means disposed in said fluid line, said valve means for selectably controlling the flow of fluid from said leakage cavity to said suction chamber in response to variations in the pressure of fluid at said impeller inlet opening.

14. A multi-stage pump according to claim 10 and further including:
slot means formed in said casing upstream of said inducer means, said slot means for communicating said induction pumping chamber with said passage means in said casing whereby backflowing fluid from said propeller means flows from said induction pumping chamber and through said passage into said suction chamber.

15. A pump including:
a casing, said casing for defining an inlet opening, a suction chamber, a fluid pumping chamber and a discharge opening;
fluid propulsion means disposed at least partially within said pumping chamber, said fluid propulsion means for establishing a flow of fluid through said inlet opening, said suction chamber, said fluid pumping chamber and said discharge opening;
prime mover for imparting operating rotational movement to said fluid propulsion means;
shaft means for operably connecting said prime mover means and said fluid propulsion means;
passage means formed in said casing, said passage means in communication with said suction chamber;
means for communicating said fluid pumping chamber upstream of said prime mover means with said passage whereby backflow generated by said prime mover means flows out of said fluid pumping chamber, through said passage and into said suction chamber; and
said passage means includes, a gas collection space and said gas collection space communicates with an exhaust port formed in said casing.

16. A pump according to claim 15 wherein said casing includes an impeller section and said fluid propulsion means includes an impeller and further including:
a wearing ring having a leakage joint disposed between said impeller and said casing; and
means for communicating said leakage joint with said passage means.

17. A multi-stage pump including:
a casing comprising,
an inducer section for defining a suction chamber and an induction pumping chamber, said inducer section having an inlet opening for allowing flow of fluid into said suction chamber and a discharge opening for allowing flow of fluid out of said induction pumping chamber, and
an impeller section for defining an impeller inlet opening, an impeller pumping chamber having a volute and a pump discharge opening, said impeller inlet opening being in communication with said discharge opening of said inducer section;
inducer means disposed within said induction pumping chamber, said inducer means for establishing a flow of fluid through said inlet opening, said suction chamber, said pumping chamber and said discharge opening;
impeller means having at least vanes and a back shroud disposed within said impeller pumping chamber, said impeller means for establishing a flow of fluid through said impeller inlet opening, said impeller pumping chamber and said pump discharge opening;
prime mover means for imparting operating rotational movement to said inducer means and said impeller means;
shaft means for operably connecting said prime mover means to said inducer means and said impeller means;
a leakage chamber disposed behind said back shroud of said impeller means;
a fluid line for communicating said leakage chamber with said suction chamber of said inducer section; and
means disposed in said fluid line for selectively controlling the flow of fluid from said leakage chamber to said suction chamber in response to variations in the pressure of fluid at said impeller inlet opening.

* * * * *

Disclaimer 3,677,659.—*John G. Williams*, Warren Township, Somerset County, N.J. MULTI-STAGE PUMP AND COMPONENTS THEREFOR. Patent dated July 18, 1972. Disclaimer filed Feb. 27, 1974, by the assignee, *Worthington Corporation*.

Hereby enters this disclaimer to claims 1, 2, 3, 4, 7 and 8 of said patent.

[*Official Gazette October 15, 1974.*]